(12) United States Patent
Reuss et al.

(10) Patent No.: US 7,971,576 B2
(45) Date of Patent: Jul. 5, 2011

(54) INTERNAL COMBUSTION ENGINE AND METHOD FOR OPERATING AN INTERNAL COMBUSTION ENGINE

(75) Inventors: Thomas Reuss, Neuenstadt (DE); Axel Macher, Neudenau (DE); Martin Gruber, Bad Wimpfen (DE)

(73) Assignee: Audi AG, Ingolstadt (DE)

( * ) Notice: Subject to any disclaimer, the term of this patent is extended or adjusted under 35 U.S.C. 154(b) by 2 days.

(21) Appl. No.: 11/987,948

(22) Filed: Dec. 6, 2007

(65) Prior Publication Data

US 2008/0149080 A1    Jun. 26, 2008

(30) Foreign Application Priority Data

Dec. 6, 2006  (DE) .................. 10 2006 057 488

(51) Int. Cl.
*F02B 47/08* (2006.01)
*F02B 47/10* (2006.01)

(52) U.S. Cl. .............. 123/568.12; 123/563; 60/605.1; 60/605.2; 701/108

(58) Field of Classification Search .......... 123/568.11, 123/568.12, 568.2, 568.31, 563, 542, 435, 123/672, 676, 680, 568.22, 559.1, 316; 165/139, 165/143, 282, 101, 103, DIG. 117, 158, 153; 60/605.2, 605.1, 278, 280, 298; 701/108
See application file for complete search history.

(56) References Cited

U.S. PATENT DOCUMENTS

| | | | | |
|---|---|---|---|---|
| 5,617,726 A * | 4/1997 | Sheridan et al. | ............. | 60/605.2 |
| 5,713,330 A * | 2/1998 | Hitomi et al. | ................. | 123/311 |
| 6,945,235 B1 * | 9/2005 | Bertilsson et al. | ........ | 123/568.11 |
| 7,017,561 B1 * | 3/2006 | Liu et al. | ................. | 123/568.12 |
| 7,299,793 B1 * | 11/2007 | Tyo et al. | ................. | 123/568.12 |
| 2003/0114978 A1 * | 6/2003 | Rimnac et al. | ................ | 701/108 |
| 2004/0040548 A1 * | 3/2004 | Reuss | ............................ | 123/563 |
| 2004/0069284 A1 * | 4/2004 | Corba | ............................ | 123/563 |
| 2005/0274366 A1 * | 12/2005 | Sato | ............................ | 123/568.2 |
| 2007/0022745 A1 * | 2/2007 | Narita et al. | ..................... | 60/286 |
| 2007/0125081 A1 * | 6/2007 | Czarnowski et al. | ........... | 60/599 |
| 2007/0144501 A1 * | 6/2007 | Joergl et al. | ............. | 123/568.12 |
| 2007/0199320 A1 * | 8/2007 | Yager et al. | ..................... | 60/599 |

FOREIGN PATENT DOCUMENTS

| | | |
|---|---|---|
| DE | 100 49 314 | 4/2002 |
| FR | 2 876 417 | 4/2006 |

* cited by examiner

*Primary Examiner* — Michael Cuff
*Assistant Examiner* — Hung Q Nguyen
(74) *Attorney, Agent, or Firm* — Novak Druce + Quigg LLP

(57) ABSTRACT

The invention relates to a method for operating an internal combustion engine, wherein exhaust gas produced by the internal combustion engine is returned to the internal combustion engine via an exhaust gas recirculation device, which comprises at least two cooling units with each of which a bypass is associated, the exhaust gas being cooled in the exhaust gas recirculation device as a function of the load state of the internal combustion engine, and wherein fresh air is fed to the internal combustion engine via a charge-air feed device, which comprises at least one cooling unit and at least one bypass connected in parallel to the cooling unit, the fresh air being supplied via the cooling unit and/or the bypass as a function of the load state. The invention also relates to an internal combustion engine comprising an exhaust gas recirculation device and a charge-air feed device.

14 Claims, 2 Drawing Sheets

INTERNAL COMBUSTION ENGINE AND METHOD FOR OPERATING AN INTERNAL COMBUSTION ENGINE

CROSS-REFERENCE TO RELATED APPLICATIONS

This application claims priority from German Application No. 10 2006 057 488.5 filed Dec. 6, 2006, hereby incorporated by reference in its entirety.

The invention relates to a method for operating an internal combustion engine, wherein exhaust gas generated by the internal combustion engine is returned to the internal combustion engine via an exhaust gas recirculation device, which comprises at least two cooling units that are each associated with a bypass. The exhaust gas is cooled in the exhaust gas recirculation device as a function of the load state of the internal combustion engine. The invention further relates to a corresponding internal combustion engine comprising an exhaust gas recirculation device.

BACKGROUND OF THE INVENTION

From DE 101 47 536 A1, an internal combustion engine is known in which in an inlet system an exhaust heat exchanger thermally connected to the exhaust gas system is provided, wherein the heat exchanger can be activated or deactivated via control valves configured as flaps. The exhaust heat exchanger can be bypassed by means of bypass lines both on the side of the inlet system and on the side of the outlet system.

In addition, from DE 103 47 834 A1 a diesel combustion engine comprising an exhaust gas aftertreatment system is known. The exhaust gas recirculation system comprises a two-path system, wherein in a first path a cooling unit is provided and the second path is connected in parallel to the first path. In addition, a charge-air cooler is disposed in the charge-air supply line.

From DE 10 2004 021 386 A1, an internal combustion engine comprising an exhaust gas recirculation system is known, wherein two heat exchangers are provided in an exhaust gas recirculation line. The exhaust gas flowing through the two heat exchangers is cooled thereby. A further heat exchanger is disposed in a charge-air line.

In addition, from FR 287 64 17 an internal combustion engine is known, wherein two heat exchangers are provided in series in a waste gas recirculation line. A three-way valve is disposed upstream of the first heat exchanger and between the two heat exchangers, respectively, a bypass branching off therefrom. Depending on the load state of the internal combustion engine, the waste gas can be conducted through both heat exchangers or through the bypass. If the engine is subject to average load, the waste gas is conducted through the first heat exchanger and past the second heat exchanger. If the first valve disposed upstream of the two heat exchangers is closed to the flow through the downstream heat exchanger, a considerable portion of the waste gas is always routed via the bypass past the second heat exchanger, even if the valve provided between the two heat exchangers is then open. With the known internal combustion engines and operating methods, cooling of the waste gas as needed can be performed only very insufficiently.

It is therefore the object of the present invention to create a method and an internal combustion engine, wherein highly efficient mixing between exhaust gas and fresh air for supply to the internal combustion engine is possible.

SUMMARY OF THE INVENTION

In a method for operating an internal combustion engine according to the invention, exhaust gas generated by the internal combustion engine is returned to the internal combustion engine via an exhaust gas recirculation device, which comprises at least two cooling units that are each associated with a bypass. The exhaust gas may optionally be cooled in the exhaust gas recirculation device as a function of the load state of the internal combustion engine. Fresh air is supplied to the internal combustion engine via a charge-air feed device, which comprises at least one cooling unit and at least one bypass connected in parallel to the cooling unit, with the fresh air being conducted via the cooling unit and/or the bypass as a function of the load state. This enables precise adjustment of the respective temperatures of the exhaust gas and of the fresh air depending on the situation. In this way, also the mixture temperature of exhaust gas and fresh air can be precisely adjusted to the respectively desired target temperature, and the depositing of exhaust gas components in the system can be considerably reduced.

The fresh air is preferably conducted through at least two cooling units of the charge-air feed device connected in series and/or through the bypass connected in parallel to the two cooling units as a function of the load state of the internal combustion engine and/or a predefinable target temperature in a charge-air line. In this way, cooling of the fresh air can be performed better on an as-needed basis. It may be provided that during regular operation of the internal combustion engine the fresh air is conducted proportionately via the bypass and the cooling unit. Particularly during coasting of the vehicle with increased load applied on the internal combustion engine, the fresh air is preferably conducted exclusively via the bypass. If the current temperature in the charge-air line is higher than the predefined target temperature, the fresh air is preferably conducted via at least one of the cooling units. Depending on the amount of variance of the temperature, the fresh air can be routed specifically through the first or second or through both cooling units. The target temperature can preferably predefined as a function of the vehicle-specific overall package comprising the internal combustion engine, the exhaust gas recirculation device and the charge-air feed device.

It may also be provided that a separate bypass is connected parallel to each cooling unit of the charge-air cooling device and that, depending on the operational state of the internal combustion engine, particularly on the at least four load states and/or the target temperature, a specific strategy is defined by means of which the fresh air is cooled as needed. As a result, fresh air can accordingly be conducted through neither of the cooling units, through the first cooling unit and the second bypass, through the first bypass and the second cooling unit, or through both cooling units of the charge-air feed device, depending on the load state. The different aforementioned flow paths of the fresh air through the charge-air feed device can accordingly, or in accordance with the predefined flow paths of the exhaust gas, be defined to run through the relevant cooling units and bypasses of the exhaust gas recirculation device as a function of the four load states.

In this way, the precision of the temperature adjustment of the fresh air and therefore also of the air mixture of exhaust gas and fresh air can be increased even further.

The operation of the internal combustion engine is preferably broken down into at least four load states, and, depending on the current load state, the exhaust gas is returned to the internal combustion engine in the exhaust gas recirculation device via a flow path specifically associated with this load state. By breaking down such a plurality of load states, cooling of the exhaust gas can be performed more precisely as needed. The performance for cooling the recirculated exhaust gas can thus become more efficient and effective, wherein the wide variety of combination possibilities allows cooling efficiency to be adjusted better to the respective current need. The deposition of exhaust gas components in the system, which is referred to as fouling, can thereby be considerably reduced.

The at least four load states are preferably defined as a function of the engine rotational speed and/or a fuel injection amount. Depending on the vehicle type and the corresponding design of the internal combustion engine, in this way a very individual definition of the load states can be made, resulting in very individual cooling of the exhaust gas as needed in the respective load states. The load states are preferably defined by the above-mentioned specific parameters in a diagram next to one another. It may be provided in particular, for example, that in a diagram illustrating the injection amount as a function of the rotational speed a first load state extends up to a rotational speed value of approximately 1800 revolutions per minute. Accordingly, for this first load state a maximum injection amount of approximately 18 mg/stroke may be defined. The first load state is preferable defined such that, starting from a maximum value of an injection amount present at a rotational speed of approximately 1000 revolutions per minute, it decreases, particularly steadily decreases, down to a value of 0 at a maximum rotational speed of this first load state at approximately 1800 revolutions per minute.

Subsequent to this first load state, a second load state can be defined, which directly follows the first load state and in the diagram extends up to a rotational speed of approximately 2750 revolutions per minute. The injection amount ranges from a value of 0 mg/stroke to a maximum of approximately 28 mg/stroke. Again, it is preferably provided that the curve upwardly delimiting this second load state steadily decreases with increasing rotational speeds, starting from a minimum rotational speed of approximately 1000 revolutions per minute and a maximum value of the injection amount of approximately 28 mg/stroke.

Accordingly, the same can be defined for a third load state adjoining the second load state, wherein the lower threshold is defined by the upper threshold of the second load state and the upper threshold is delimited by a curve wherein the injection amount steadily decreases with increasing rotational speeds. The third load state extends to no more than a rotational speed of approximately 3400 revolutions per minute. The maximum injection amount is 42 mg/stroke, for example. Again, following the third load state, a fourth load state may be defined in the diagram, the lower threshold of which is defined by the characteristic line of the upper limit and the third load state.

It is preferable that in a first load state signifying a lower load of the internal combustion engine, the exhaust gas is conducted past the cooling units of the exhaust gas recirculation device and via the bypasses. In this phase, the cooling effect is relatively low. It is however sufficient, since in this first load state the temperature of the exhaust gas is relatively low.

It is preferable that in a second load state signifying a higher load of the internal combustion engine in comparison with the first load state, the waste gas is conducted via a first cooling unit, particularly via a first cooling unit disposed upstream of the second cooling unit in a series connection configuration of the cooling units, and the bypass of the second cooling unit. In this specific phase, the exhaust gas is explicitly conducted directly through the first cooling unit, thus achieving a corresponding cooling effect.

In a third load state signifying a higher load of the internal combustion engine in comparison with the second load state, the waste gas is conducted via a second cooling unit, particularly via a second cooling unit disposed downstream of the first cooling unit in a series connection configuration of the cooling units, and the bypass of the first cooling unit. Unlike in the second load state, in this way the exhaust gas, which is generally hotter than in the second load state, is first conducted via a bypass, where it achieves appropriate cooling along a longer path outside of the cooling unit and is only then conducted into a second cooling unit for additional and further cooling.

It is preferable if in a fourth load state signifying a higher load of the internal combustion engine than the third load state, the waste gas is conducted via both cooling units. Especially when the exhaust gas has a relatively high temperature, very effective cooling can be achieved hereby. The performance for cooling the recirculated exhaust gas can be achieved independently of the operating point of the internal combustion engine and preferably of the thermodynamic ambient conditions. The combination of a plurality of cooling units, which can be connected in series or parallel to one another, and the respective bypasses enable very detailed cooling on an as-needed basis when dividing the internal combustion engine into at least four load states.

In this way, also a highly efficient reduction in nitrogen oxide emissions is enabled within a wide engine map range, while avoiding cooler fouling.

An internal combustion engine according to the present invention comprises an exhaust gas recirculation device for recirculating exhaust gas generated by the internal combustion engine, the exhaust gas recirculation device being provided with at least two cooling units for cooling the exhaust gas as a function of the load state of the internal combustion engine, a bypass being connected in parallel to each cooling device. A charge-air feed device for feeding fresh air to the internal combustion engine comprises at least one cooling unit, which is connected in parallel to a bypass. In this way, it is also possible to adjust the temperature of the fresh air with greater precision on an as-needed basis and depending on the situation.

Preferably it may be provided that the charge-air feed device comprises at least two cooling units connected in series, to which a single bypass is connected in parallel. It may also be provided that a separate bypass is connected in parallel to each of the cooling units.

The operation of the internal combustion engine is preferably broken down into at least four load states, and, depending on the current load state, the exhaust gas can be returned to the internal combustion engine in the exhaust gas recirculation device via a flow path specifically associated with this load state.

In this way, cooling of the returned exhaust gas on an as-needed basis becomes possible. As a result of the relatively high defined number of load states, individualized cooling of the exhaust gas can be better performed for each situation.

An ideal temperature of an intake manifold and an ideal mixture ratio of exhaust gas and fresh air can thus be achieved by regulating charge cooling in this manner and additionally by means of a temperature of the returned exhaust gas that can be controlled or regulated in its cooling efficiency.

The precise exhaust gas recirculation rate can be regulated directly, preferably with the help of an exhaust gas sensor, for example a lambda probe.

At least one of the cooling units, particularly the second cooling unit disposed downstream of the first cooling unit, of the exhaust gas recirculation device and/or at least one cooling unit of the charge-air feed device can be coupled to a low-temperature cooling circuit. In these elements, the temperature values preferably range between 30° C. and 40° C. If only one of the cooling units is connected to the low-temperature cooling circuit, the second one can be connected to a separate cooling circuit, in which also temperatures of approximately 90° C. can prevail.

The invention makes it possible to maintain the thermodynamic boundary conditions for the combustion process (fresh air, exhaust gas, temperature) nearly constant at different ambient conditions and thus considerably expand the ideal emissions and usage range for the customer's operation.

When using homogeneous diesel combustion, the combustion conditions can be adjusted to be nearly constant within a wide operating range. With the proposed concept, therefore low-temperature exhaust gas recirculation with register exhaust gas recirculation cooling can be used.

For exhaust gas aftertreatment systems, such as SCR (selective catalytic reaction), NOx storage systems, particulate filters or a combination of these systems, the exhaust gas temperature can be adjusted to improve efficiency for different ambient conditions. For the customer's operation, this means optimized consumption during regeneration cycles, particularly in the cold season, and improved component protection for OxiCats and DPF (diesel particular filters).

BRIEF DESCRIPTION OF THE DRAWINGS

Exemplary embodiments of the invention will be described hereinafter in more detail based on schematic illustrations, wherein.

In the figure, identical elements or elements with equivalent functions are denoted with the same reference numerals.

DETAILED DESCRIPTIONS OF THE PREFERRED EMBODIMENTS OF THE INVENTION

Figure 1:
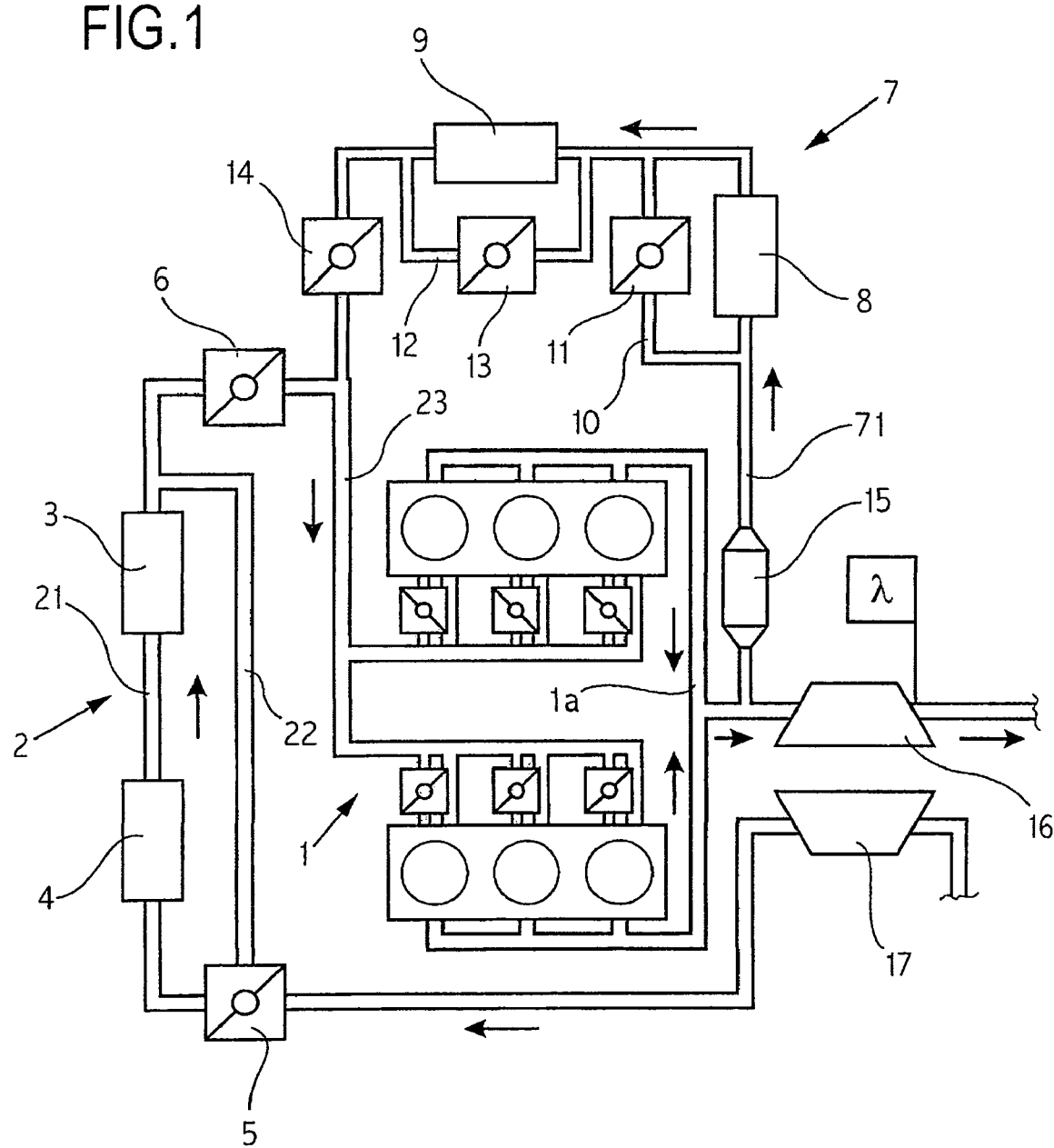
FIG. 1 is a schematic illustration of an inventive internal combustion engine comprising an exhaust gas recirculation device and charge-air feed device.

FIG. 1 shows an internal combustion engine 1, which is configured or coupled with a charge-air feed device and an exhaust gas recirculation device. The charge-air feed device 2 comprises a first flow path 21, wherein in the exemplary embodiment two cooling units 3 and 4, which are configured as heat exchangers, are disposed in series to one another. Parallel to this first path 21 a second path is provided, which is configured as a bypass 22 in parallel to the two cooling units 3 and 4 and therefore also in parallel to the first path 21. A valve 5 serves the adjustment of the flow path of the fresh air through the charge-air feed device 2. In addition, a second valve 6 is disposed in the charge-air feed device 2 downstream of the first path 21 and the bypass 22 and upstream of an opening of an exhaust gas recirculation device 7 in an intake pipe or a charge-air line 23.

In the example, a single common bypass 22 is connected in parallel to the two cooling units 3 and 4. It may also be provided that a separate bypass is connected in parallel to each of the cooling units 3 or 4.

The exhaust gas recirculation device 7 branches off an exhaust gas line 1a, in which the exhaust gas generated by the internal combustion engine 1 is removed. For this purpose, the charge-air feed device 7 comprises a first flow path 71 in which likewise two cooling units 8 and 9, which are likewise configured as heat exchangers, are disposed in series to one another. A first bypass 10 is connected in parallel to the cooling unit 8, wherein a second bypass 12 is connected in parallel to the second cooling unit 9. Thus, a dedicated separate bypass 10 or 12 is connected in parallel to each cooling unit 8 and 9 of the exhaust gas recirculation unit 7. In the bypass 10 a valve 11 is provided, and in the bypass 12 a valve 13 is provided. A further valve 14 is disposed in the area before the exhaust gas recirculation device 7 opens into the charge-air line 23 or the intake manifold. In addition, a catalytic converter 15 is disposed in the branched line 71 upstream of the cooling unit 8. The two valves 11 and 13 can also be provided on the respective branches of the flow paths upstream of the respectively associated bypass 10 and 12 and the associated cooling unit 8 or 9 and can be configured as 3-way valves. In this way, it is possible to precisely adjust where the exhaust gas is supposed to flow through.

Furthermore, a turbine 16 is provided in the exhaust gas line 1a, the turbine being coupled to a supercharger 17 to form an exhaust gas turbocharger. The supercharger 17 is disposed in a partial line of the charge-air feed device 2 feeding the fresh air.

Figure 2:
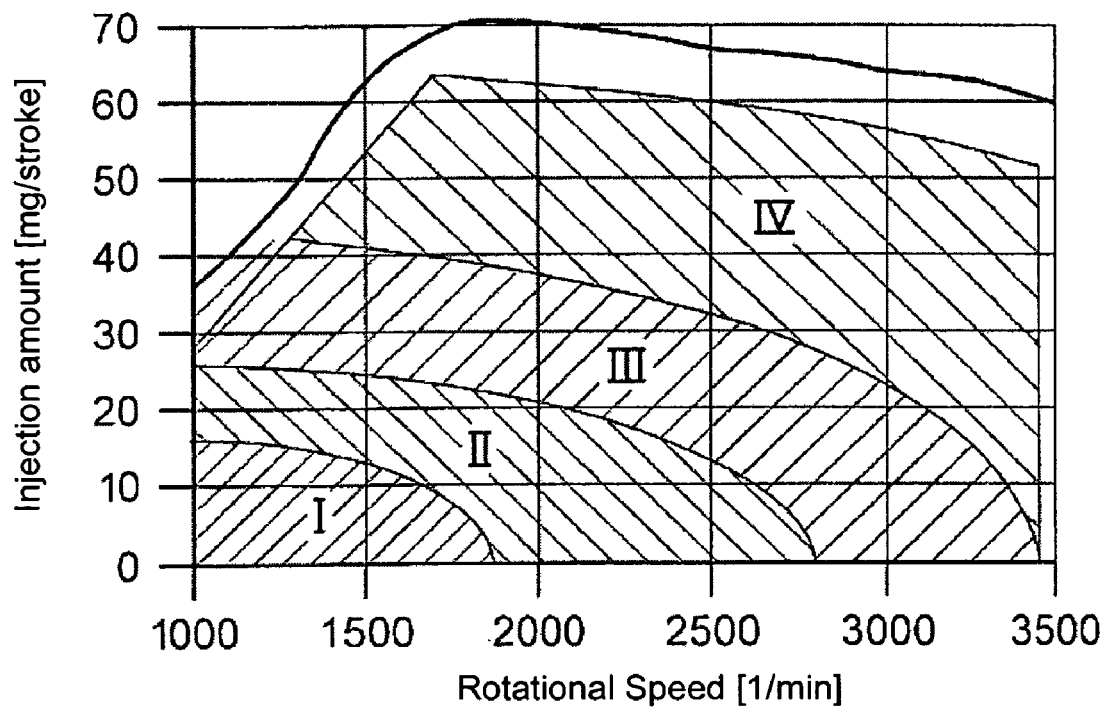
FIG. 2 is a diagram illustrating the injection amount dependency on the rotational speed of the internal combustion engine for four load states of the internal combustion engine.

FIG. 2 shows a diagram, wherein the injection amount is illustrated as a function of the rotational speed of the internal combustion engine 1. The diagram shows four load states I to IV of the internal combustion engine 1, the states being specifically and individually defined, and depending on these states the exhaust gas is specifically guided in the exhaust gas recirculation device 7. The illustration according to FIG. 2 shows that the first load state I signifies a relatively low load of the internal combustion engine 1. The load state II signifies a higher load of the internal combustion engine 1 in comparison with the first load state. The same also applies to the load states III and IV. In the example, the four load states directly join each other, wherein the transition regions are each marked by a characteristic curve, which starting from a maximum value of an injection amount steadily decreases with increasing rotational speeds. In the example, these delimiting curves are defined such that they drop to an injection amount of 0 mg/stroke at the maximum speed which delimits the respective load state.

The diagram shown in FIG. 2 is only an exemplary illustration. The explicit four load states and the boundaries thereof are likewise exemplary. The essential aspect is that at least four load states are defined, and that particularly the cooling of the returned exhaust gas can be performed on an as-needed basis.

Figure 3:
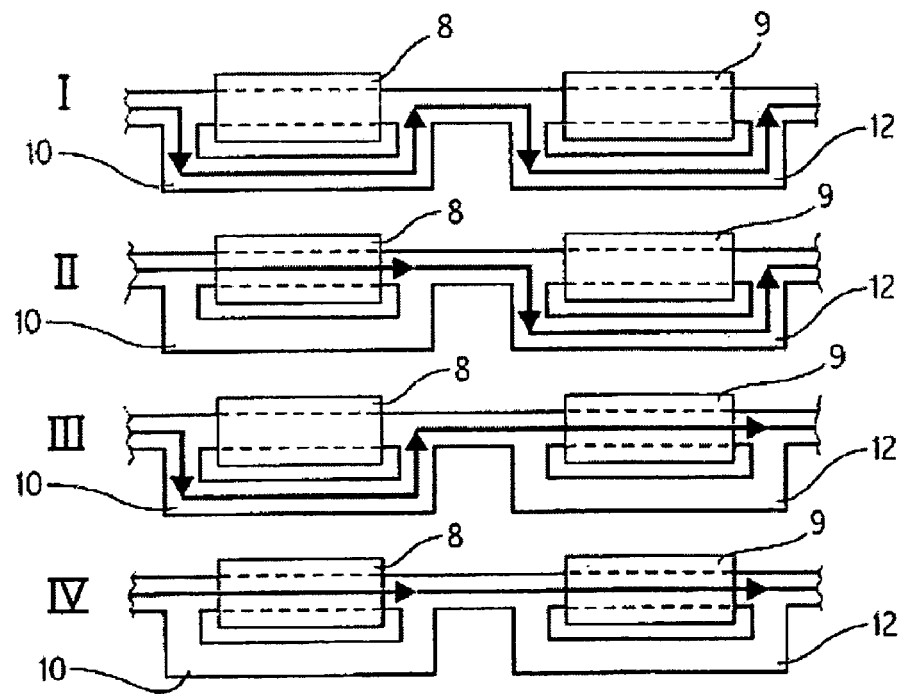
FIG. 3 are illustrations of flow paths of the returned exhaust gas in the exhaust gas recirculation device as a function of the respectively associated load states.

FIG. 3 shows flow paths of the recirculated exhaust gas in the exhaust gas recirculation device 20, the paths being specifically associated with the load states I to IV.

In the first load state I, the exhaust gas to be returned is conducted neither through the cooling unit 8 nor through the cooling unit 9. The entire recirculated exhaust gas is conducted via the bypasses 10 and 12 past the cooling units 8 and 9.

In the second load state II, the exhaust gas to be returned is conducted through the first cooling unit 8 and via the associated bypass 12 past the second cooling unit 9.

In the third load state III, the exhaust gas to be returned is conducted via the bypass 10 connected in parallel to the cooling unit 8 and through the second cooling unit 9.

In the fourth load state IV, the exhaust gas to be returned is conducted through both cooling units 8 and 9.

Furthermore, the fresh air is conducted in the charge-air feed device 2 as a function of the operational state of the internal combustion engine 1 and a defined target temperature, which may be 18° C., for example.

In addition, it may be provided that in the case of a configuration in which a separate bypass is connected in parallel to each cooling unit 3 or 4, as is shown by way of example in the exhaust gas recirculation device 7 for the cooling units 8 and 9 in FIG. 1, the fresh air is individually conducted particularly as a function of the four load states according to the example in FIG. 3.

The invention claimed is:

1. A system for supplying combustible products to an internal combustion engine, comprising;
   an exhaust gas recirculation line including first and second cooling units connected in series, each provided with a bypass;
   a charge air line including third and fourth cooling units provided with a bypass; and
   means operable to effect flow of said products through selected ones of said cooling units and said bypasses responsive to predetermined load states of said engine.

2. The system according to claim 1 wherein said load states are a function of at least one of the rotational speed and the amount of fuel injection of said engine.

3. The system accord to claim 1 wherein said operable means is effective to selectively provide flow through said third and fourth cooling units and said bypass thereof responsive to selected ones of said load states.

4. The system according to claim 3 wherein in a first load state, said operable means is effective to provide flow through the bypasses of said first and second cooling units.

5. They system according to claim 3 wherein in a second load state, said operable means is effective to provide flow through said first cooling unit and the bypass of said second cooling unit.

6. The system according to claim 3 wherein in a third load state, said operable means is effective to provide flow through the bypass of said first cooling unit and said second cooling unit.

7. The system according to claim 3 wherein in a fourth load state, said operable means is effective to provide flow through said first and second cooling units.

8. A method of supplying combustible products to an internal combustion engine provided with an exhaust gas recirculation line including first and second cooling units connected in series, each provided with a bypass, and a charge air line including third and fourth cooling units in series and provided with a bypass comprising selectively conducting recirculating exhaust gases through said first and second cooling units and said bypasses thereof and supplying charge air through said third and fourth cooling units and said bypass thereof to said engine, responsive to predetermined load states of said engine.

9. The method according to claim 8 wherein said load states are a function of at least one of the rotational speed and amount of fuel injection of said engine.

10. The method according to claim 8 including selectively conducting said charge air through said third and fourth cooling units and said bypass thereof responsive to selected ones of said load states.

11. The method according to claim 10 wherein in a first load state, conducting said recirculating exhaust gas through the bypasses of said first and second cooling units.

12. The method according to claim 10 wherein in a second load state, said recirculating exhaust gases are conducted through said first cooling unit and the bypass of said second cooling unit.

13. The method according to claim 10 wherein in a third load state, said recirculating exhaust gases are conducted through said bypass of said first cooling unit and second cooling unit.

14. The method according to claim 10 wherein in fourth load state, said recirculating exhaust gases are conducted through said first and second cooling units.

* * * * *